(12) United States Patent
Craig et al.

(10) Patent No.: US 7,973,287 B2
(45) Date of Patent: Jul. 5, 2011

(54) DETECTION OF ALPHA-PARTICLE EMITTING ISOTOPES

(75) Inventors: Richard A. Craig, Richland, WA (US); Richard S. Seymour, Clinton, TN (US)

(73) Assignee: Nucsafe, Inc, Oak Ridge, TN (US)

( * ) Notice: Subject to any disclaimer, the term of this patent is extended or adjusted under 35 U.S.C. 154(b) by 618 days.

(21) Appl. No.: 11/838,608

(22) Filed: Aug. 14, 2007

(65) Prior Publication Data
US 2009/0101830 A1   Apr. 23, 2009

(51) Int. Cl.
G01T 1/00 (2006.01)
G01T 1/167 (2006.01)
G01J 1/42 (2006.01)

(52) U.S. Cl. .............. 250/394; 250/390.01; 250/395; 250/370.02; 250/370.03

(58) Field of Classification Search ............ 250/370.06, 250/370.02, 394, 395, 393, 363.02, 370.07, 250/366, 370.03, 370.05, 390.04
See application file for complete search history.

(56) References Cited

U.S. PATENT DOCUMENTS

| | | | |
|---|---|---|---|
| 3,234,382 A | 2/1966 | Scherbatskoy | |
| 3,562,526 A | 2/1971 | Lawson | |
| 4,259,578 A | 3/1981 | Thompson | |
| 4,286,150 A * | 8/1981 | Allen | 250/269.2 |
| 4,337,397 A | 6/1982 | Vacher | |
| 4,417,142 A | 11/1983 | Malmqvist et al. | |
| 4,463,263 A | 7/1984 | Padawer | |
| 5,138,165 A | 8/1992 | Petroff | |
| 6,791,093 B2 | 9/2004 | Caldwell et al. | |
| 6,828,564 B2 | 12/2004 | Worstell et al. | |
| 2003/0164455 A1 * | 9/2003 | Hughes et al. | 250/375 |
| 2003/0205677 A1 | 11/2003 | Caldwell et al. | |
| 2005/0205799 A1 | 9/2005 | Gentile et al. | |
| 2006/0049357 A1 | 3/2006 | Tumer | |
| 2006/0175552 A1 * | 8/2006 | Kojima et al. | 250/363.05 |
| 2006/0273250 A1 * | 12/2006 | Ishitsu et al. | 250/252.1 |
| 2007/0001123 A1 | 1/2007 | Andrews et al. | |

FOREIGN PATENT DOCUMENTS

| | | |
|---|---|---|
| JP | 11109036 | 4/1999 |
| WO | WO 2006011901 | 2/2006 |
| WO | WO 2006130486 | 12/2006 |

OTHER PUBLICATIONS

Geiger et al. "Radiological Health Aspects of Oil Well Logging," Public Health Reports, vol. 81, No. 12; published Dec. 1966, pp. 1064-1070; Retrieved from the internet on [Aug. 24, 2010]; Retrieved from <http://ncbi.nlm.nih.gov/pmc/articles/PMC1919921/pdf/pubhealthreporig00048-0018.pdf>.*

* cited by examiner

Primary Examiner — David P Porta
Assistant Examiner — Yara B Green
(74) Attorney, Agent, or Firm — Luedeka, Neely & Graham, P.C.

(57) ABSTRACT

A system and method for detection of alpha particles generated by a test material in proximity to a light atomic weight element. The system includes a neutron detector that is configured to detect a rate of generation of neutrons produced by an (alpha, n) reaction between the test material and the light atomic weight element. There is also at least one gamma-ray detector configured to measure a rate of generation of 511 keV gamma rays produced by an annihilation reaction triggered by a positron emission from a daughter product of the light atomic weight element. A comparator is configured to compare the rate of generation of neutrons and the rate of generation of 511 keV gamma rays.

20 Claims, 1 Drawing Sheet

DETECTION OF ALPHA-PARTICLE EMITTING ISOTOPES

FIELD

This invention relates to the field of detection of radioactive materials. More particularly, this invention relates to the detection of alpha-particle emitting isotopes.

BACKGROUND

Short-lived radionuclides that emit alpha particles are particularly insidious radiological poisons for humans and animals. The large mass and electric charge of alpha particles precludes their transmission beyond a few millimeters. However, in the case of a short-lived radionuclide the short half-life means that the radionuclide is emitting large numbers of energetic particles that, on a per molecule basis, deliver about 6 orders of magnitude as much energy as a chemical explosive. If the alpha-particle emitting radionuclide is within a human body this energy is very efficiently delivered to the body's nearby cells. Consequently, very large radiological doses can be delivered by small amounts of material, generally resulting in illness or death. The alpha particles themselves typically cannot be directly detected because substantially all of the alpha particles are absorbed by the body. Some alpha-particle emitters also emit gamma rays that can be detected, but some alpha-particle emitting radionuclides may emit little or no associated gamma radiation. If the daughter products of these radionuclides are stable or also emit little or no associated gamma rays, this radiological poison may be very difficult to detect within the body or within container that has even very simple shielding.

These properties make such radionuclides candidates for covert poisons or terror weapons. For instance, $^{210}$Po is easily made by persons with access to nuclear reactors. $^{210}$Po emits essentially no gamma or beta radiation and its daughter ($^{206}$Pb) is stable. If properly distributed, a few 10's of grams of $^{210}$Po could contaminate the air in a large room or chamber (up to even a half million cubic feet) with about one-tenth of a lethal dose per liter. An individual dose of about 1 microgram would be almost certainly lethal to the recipient.

It would be very useful to have improved means of detecting $^{210}$Po and similar alpha-particle emitting nuclei. Such means would likely also have utility for detection of other alpha-particle emitting nuclei that also emit gamma radiation.

SUMMARY

The present invention provides a system for detection of alpha particles generated by a material in proximity to a light atomic weight element. In one embodiment the system includes a neutron detector that is configured to detect a rate of generation of neutrons produced by an (alpha, n) reaction between the material and the light atomic weight element. The system also has at least one gamma-ray detector that is configured to detect a rate of generation of 511 keV gamma rays produced by an annihilation reaction triggered by a positron emission from a daughter product of the light atomic weight element. A comparator is provided. The comparator is configured to compare the rate of generation of neutrons and the rate of generation of 511 keV gamma rays.

A method is provided for detection of alpha particles generated by a material proximate to a light atomic weight element. The method includes a step (a): measuring a rate of generation of neutrons produced by an (alpha, n) reaction between the material and the light atomic weight element, a step (b): measuring a rate of generation of 511 keV gamma rays produced by an annihilation reaction triggered by a positron emission from a daughter product of the light atomic weight element, and a step (c): comparing the rate of generation of neutrons with the rate of generation of 511 keV gamma rays to detect alpha particles generated by the material.

Another method embodiment is provided for detection of alpha particles generated by a material. This method includes a step of disposing a light atomic weight element proximal to the material. The method proceeds with a step of measuring a rate of generation of neutrons produced by an (alpha, n) reaction between the test material and the light atomic weight element and a step of measuring a rate of generation of 511 keV gamma rays produced by an annihilation reaction triggered by a positron emission from a daughter product of the light atomic weight element. The method further includes a step of comparing the rate of generation of neutrons with the rate of generation of 511 keV gamma rays to detect alpha particles generated by the material.

BRIEF DESCRIPTION OF THE DRAWINGS

Various advantages are apparent by reference to the detailed description in conjunction with the figures, wherein elements are not to scale so as to more clearly show the details, wherein like reference numbers indicate like elements throughout the several views, and wherein.

DETAILED DESCRIPTION

Figure 1:
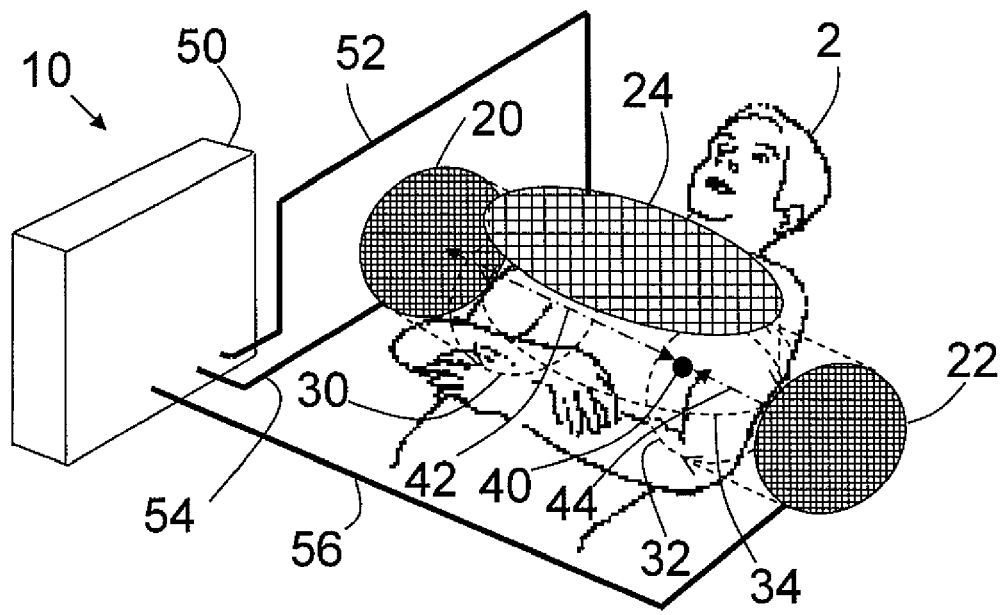
FIG. 1 is a somewhat schematic illustration of a system for detecting a radiological signature emanating from a human subject as the result of alpha particles emitted therein.

In the following detailed description of the preferred embodiments, reference is made to the accompanying drawings, which form a part hereof, and within which are shown by way of illustration the practice of specific embodiments of systems for detection of alpha particles generated by a test material in proximity to a light atomic weight element, and embodiments of methods for detection of alpha particles generated by a test material in proximity to a light atomic weight element, and embodiments of methods for detection of alpha particles generated by a test material. It is to be understood that other embodiments may be utilized, and that structural changes may be made and processes may vary in other embodiments.

$^{210}$Po is a short-lived alpha-particle emitting isotope, having a half life of about 138 days. If an alpha particle emitted during the decay of a $^{210}$Po nucleus strikes a nearby light weight element, (such as dominant isotopes of carbon or oxygen), it can initiate an "(alpha, n)" reaction, where the lighter element is momentarily transformed to a heavier element that (virtually immediately) emits a neutron. Such (alpha, n) reactions are quite rare in proportion to the emission of alpha particles, and an (alpha, n) reaction initiated by a lethal dose of $^{210}$Po would probably generate neutron emissions at "only" a rate on the order of $10^3$ neutrons per second. That rate might not be high enough to set off neutron alarms.

The daughters (reaction products) of (alpha, n) reactions are, in many cases, positron emitters. Positron emitters have a distinctive signature, namely two oppositely directed 511 keV gamma rays emitted simultaneously as a result of an annihilation reaction of the positron with a nearby electron. Thus, two gamma-ray detectors on opposite sides of a suspect object (e.g., a person), operating in coincidence and in conjunction with a neutron detector may be able to detect and measure an alpha-emitting radionuclide, including alpha-particle-only-emitting radionuclides. However, because the positron-emitting daughters have finite half-lives (seconds to minutes) and the neutron has a detection time on the order of 10's of microseconds, the three particles likely could not be detected in true triple temporal coincidence. But these same finite half-lives virtually guarantee that the positron emitters will grow until secular equilibrium is reached such that the positron emission rate is equal to the neutron generation rate. Thus, there is a temporal coincidence between the two 511 keV gamma rays and a spatial and rate coincidence between the three emissions (the 511 keV gamma rays and the neutrons).

It is important to note that the detection of a 511 keV gamma ray may not involve 511 keV deposited in the detector. Such a gamma-ray interaction may deposit (or be observed to have deposited) any amount of energy from a lower electronic cutoff up to about 600 keV. This variation may be due to Gaussian broadening and/or due to a gamma ray losing some energy in the passage from the initial positron annihilation to the detector. However, the simultaneity of the two gamma rays is very beneficial in separating the observance of positron annihilations from nuisance events. The probability of two background events occurring in the lower cutoff to 600 keV regime in a few nanosecond window is very small.

The detection of small quantities of an alpha-emitting radionuclide in vivo is feasible because all living matter contains carbon and oxygen, both of whose dominant isotopes participate in (alpha, n) reactions. The detection of larger quantities of an alpha-emitting radionuclide that is close contact to a dispersant material is also feasible because most explosive and pyrotechnic dispersants also contain carbon and oxygen. Such detection by techniques described herein is feasible even for materials in a shielded container, making these approaches of particular value.

In a primary embodiment, a neutron detector and two gamma-ray detectors are placed in proximity to and on opposite sides of a suspect material (e.g., a human body or a material sample). Typically, the two gamma-ray detectors are operated in coincidence such that only gamma-ray events in each detector associated with 511 keV gamma rays occurring within a few nanosecond time window are counted. The time window is chosen based on the scale of the suspect material; a rule of thumb is that one nanosecond is about 1 foot for a particle traveling at the speed of light. Thus, for objects having a size on the order of about 1 foot, a 3 to 5 nanosecond coincidence window generally suffices. This coincidence criterion eliminates essentially all background gamma radiation, giving only signals from positron emitters and positrons created in the suspect body by pair-production background reactions. Spatially coincident neutrons (above background) detected at a rate implying emission rates similar to that of the positrons may be used to confirm the presence of (alpha, n) reactions within the suspect material. The neutron detector need have no special configuration with respect to the gamma-ray detectors, it need only be "looking" at the sample.

In its simplest form, one embodiment consists of a gamma-ray detector configured to detect 511 keV gamma rays and a neutron detector, with both detectors having a field of view of the same spatial area of a suspect material. The suspect material may, for example, be a living person or animal or plant, or a cadaver, or a package, or a shipping container. Detection of 511 keV gamma rays and neutrons at substantially the same rate provides an indication that an alpha-particle generator may be present in the suspect material. This indication is viable even though this technique lacks the more definitive character of a coincident detection of two gamma rays (each originally 511 keV) and even though the sensitivity of this approach is reduced by the fact that a fraction of the interactions of the 511 keV photons with a detector fall in the photopeak.

One embodiment of a system for detection of alpha particles generated by a test material in proximity to a light atomic weight element is illustrated in FIG. 1. A human subject 2 is being examined by a system 10 for the presence of alpha-particle emitters. System 10 includes a first 511 keV gamma-ray detector 20 and a second oppositely-oriented 511 keV gamma-ray detector 22. The use of oppositely-oriented 511-keV gamma-ray detectors is a beneficial configuration because it means that the area of the detector (aka geometric efficiency) only enters the equation once, because if one gamma ray intercepts a detector, the other oppositely-directed gamma ray will have a high probability of intercepting the complementary detector.

The system 10 also includes a neutron detector 24. The neutron detector 24 is configured for detection of neutrons having energy in the range of 0 to 5.0 MeV or more, with particular emphasis on the 1 to 4 MeV region. This range is derived from a consideration that for $^{210}$Po, for instance, the alpha particle energy is 5.3 MeV. For a carbon target, the neutron spectrum runs from about 2.0 MeV (threshold) to about 7.5 MeV with a peak at about 3.7 MeV. For an oxygen target, the range is 0 to about 4.0 MeV with a peak of about 2.3 MeV. For a fluorine target, the peak is about 1.35 MeV.

The first 511 keV gamma-ray detector 20 has a field of view 30, the second 511 keV gamma-ray detector 22 has a field of view 32, and the neutron detector 24 has a field of view 34. Preferably, the fields of view 30, 32, and 34 each cover the same spatial volume of the human subject 2. FIG. 1 further depicts an alpha-particle emitting source 40. Alpha-particles emitted by the alpha-particle source 40 induce the generation of neutrons as a result of (alpha, n) reactions and induce the generation of two oppositely-directed 511 keV gamma rays as a result of an annihilation reaction of a positron emitted from the daughter of (alpha, n) reaction.

In some embodiments the first 511 keV gamma-ray detector 20 and the second 511 keV gamma-ray detector 22 may be combined into a single 511 keV gamma-ray detector that encircles a substantial portion of the torso of the human subject 2. In such embodiments the single 511 keV gamma-ray detector is configured to discriminate between two pulses from simultaneously-emitted 511 keV gamma rays that appear in a very short interval—seeing them as two distinct pulses rather than as one somewhat larger pulse. In such embodiments the single 511 keV gamma-ray detector cannot discern whether the two pulses are oppositely-directed. It is preferred to split an encircling 511 keV gamma-ray detector in two so as to make it easier to detect coincidence. However, the detection of simultaneously-emitted 511 keV gamma rays may be used without discernment of their opposite direction as an indication of the occurrence of an (alpha, n) reaction.

The direction of neutron emission and the directions of the oppositely-directed 511 keV gamma rays are randomly distributed across 360 spherical degrees. Consequently, the neutron emitted from a particular (alpha, n) reaction and the oppositely-directed gamma rays triggered by the that particular (alpha, n) reaction may not all be detected by the combination of the first and second 511 keV gamma-ray detectors 20 and 22 and the neutron detector 24. However, detections will reach a statistical equilibrium and one or more scaling factors may be applied to the counts from these detectors to compensate for differences in the percentage of 360 spherical degree detection ability of each detector.

A comparator 50 is provided to compare the rate of detection of 511 keV gamma rays with the rate of detection of neutrons. The comparator 50 may be a general purpose computer fitted with detector interface boards, or a special purpose instrument, or a similar device. The comparator 50 is connected to the neutron detector 24 through an interface connection 52, is connected to the first 511 keV gamma-ray detector 20 through an interface connection 54, and is connected to the second 511 keV gamma-ray detector 22 through an interface connection 56. The interface connections 52, 54, and 56 may be wired or wireless connections.

In the illustration of FIG. 1, a first 511 keV gamma ray emanating from alpha-particle emitting source 40 travels a first distance 42 to reach the first 511 keV gamma-ray detector 20, whereas the oppositely-directed 511 keV gamma ray travels a second distance 44 (that is different from first travel distance 42) to reach the second 511 keV gamma-ray detector 22. Such differences in travel distance result in travel time differences between simultaneously-emitted 511 keV gamma rays. Such travel time differences may be accounted for in the comparator 50 by, for example, adjusting the time window for what constitutes simultaneously-emitted 511 keV gamma rays. As previously noted, a time window of approximately 3-5 ns may be used, but in some embodiments a window of approximately 10 ns may be used. The terms "simultaneously-detected" and "simultaneous detection" refers to detection within a detection time window. As previously noted, while simultaneous detection of oppositely-directed 511 keV gamma rays may provide a preferred indicator of (alpha, n) reactions, the simultaneous detection of 511 keV gamma rays (without assessment of their being oppositely-directed) may provide a helpful indication of (alpha, n) reactions.

Figure 2:
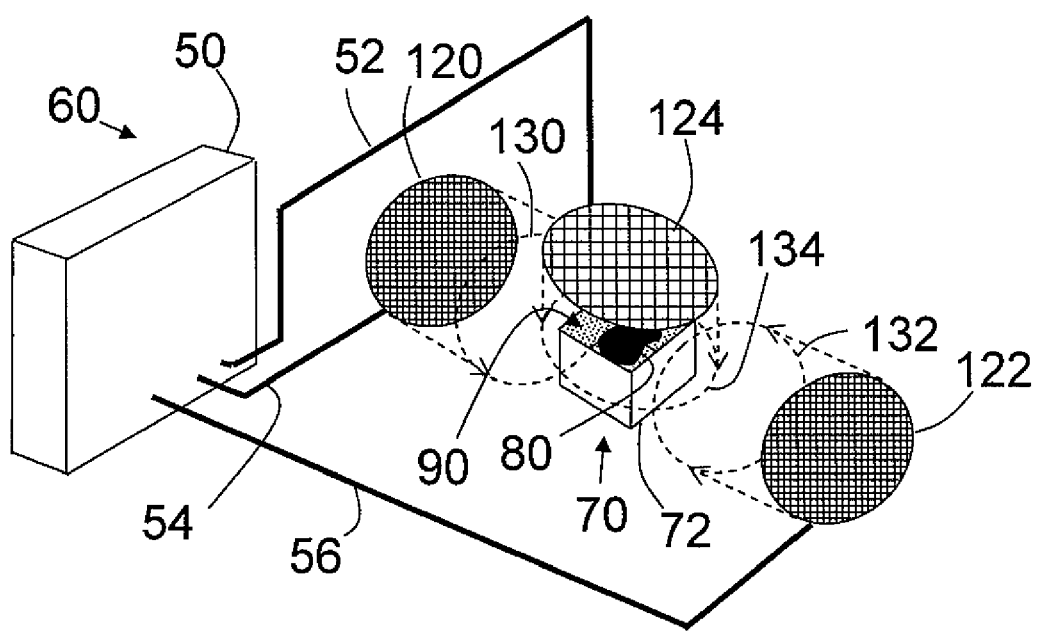
FIG. 2 is a somewhat schematic illustration of a system for detecting a radiological signature emanating from a material sample as the result of alpha particles emitted therein.

FIG. 2 illustrates a further embodiment of a system 60 for detection of alpha particles generated by a test material in proximity to a light atomic weight element. In FIG. 2 a sample box 70 is disposed in the fields of view of a first 511 keV gamma-ray detector 120, a second oppositely-oriented 511 keV gamma-ray detector 122, and a neutron detector 124. The detectors 120, 122, and 124 of FIG. 2 are similar to the detectors 20, 22, and 24 of FIG. 1. However, the first 511 keV gamma-ray detector 120 has a field of view 130, the second 511 keV detector 122 has a field of view 132, and the neutron detector 122 has a field of view 134. In the embodiment of FIG. 2 each detector 120, 122, and 124 has a field of view (130, 132, and 134 respectively) that covers the entire sample box 70.

A comparator 50, also used in the embodiment of FIG. 1, is provided to compare the rate of generation of 511 keV gamma rays with the rate of neutron generation. The comparator 50 is connected to the neutron detector 124 through an interface connection 52, is connected to the first 511 keV gamma-ray detector 120 through an interface connection 54, and is connected to the second 511 keV gamma-ray detector 122 through an interface connection 56.

A sample material 80 is disposed in the sample box 70. The sample box 70 has walls 72 that are substantially transparent to gamma rays and neutrons. The system 60 may, for example, be used to detect the presence of $^{238}UF_6$ in the sample 80. $^{238}U$ is an alpha particle emitter and when $^{238}U$ spontaneously emits an alpha particle the $^{238}U$ is transformed into $^{234}Th$. The alpha particle sometimes strikes a $^{19}F$ nucleus and the $^{19}F$ nucleus first absorbs the alpha particle and then emits a neutron, transforming the $^{19}F$ to $^{22}Na$. The neutron is detected by the neutron detector 126. The daughter product $^{22}Na$ is a positron emitter. When the $^{22}Na$ emits a positron, the positron collides with a nearby electron and the combination annihilates by emitting two oppositely-directed 511 keV gamma rays. The oppositely-directed 511 keV gamma rays are detected by the first 511 keV gamma-ray detector 120 and the second 511 keV gamma-ray detector 122. The comparator 50 determines the rate of neutron generation with the rate of oppositely-directed 511 keV gamma rays, to indicate whether an alpha-particle emitter such as $^{238}U$ is present in the sample 80.

In a further embodiment illustrated in FIG. 2, a light weight element 90, such as carbon or oxygen, may be disposed around at least a portion of the sample 80 in the sample box 70. It is important that the light element(s) be in close proximity to the alpha emitter. Therefore, while gaseous O or $CO_2$ may be introduced deliberately for this purpose, the more effective application is where the light element naturally appears commingled with the alpha emitter such as in solution or as a homogeneous mixture. If there is an alpha-particle emitter in the sample 80 near an interface between the sample 80 and the light weight element 90, alpha particles may initiate the previously-described (alpha, n) reaction with the light weight element 90, thereby also triggering a positron emission with the subsequent emission of oppositely-directed 511 keV gamma rays that may be detected by the system 60.

Methods are also provided for the detection of alpha particles generated by a test material that is proximate to a light atomic weight element. In one embodiment, a method includes the step (a) where a measurement is made of a rate of generation of neutrons produced by an (alpha, n) reaction between the test material and the light atomic weight element. In step (b) a measurement is made of a rate of generation of 511 keV gamma rays produced by an annihilation reaction triggered by a positron emission from a daughter product of the light atomic weight element. In a step (c) the rate of generation of neutrons with the rate of generation of 511 keV gamma rays are compared to detect alpha particles generated by the test material. In variations of this method the rate of generation of oppositely-directed and/or simultaneously-emitted 511 keV gamma rays is compared with the rate of generation of neutrons. In a further variation, scaling factors are used to correct for differences in detection fields of view between the neutron detector and the gamma-ray detector(s).

In a further method embodiment, a step (a) involves disposing a light atomic weight element proximal to a test material. Then a step (b) provides for measuring a rate of generation of neutrons produced by an (alpha, n) reaction between the test material and the light atomic weight element and a step (c) provides for measuring a rate of generation of 511 keV gamma rays produced by an annihilation reaction triggered by a positron emission from a daughter product of the light atomic weight element. A step (d) provides for comparing the rate of generation of neutrons with the rate of generation of 511 keV gamma rays to detect alpha particles generated by the test material. In variations of this method the rate of generation of oppositely-directed and/or simultaneously-emitted 511 keV gamma rays is compared with the rate of generation of neutrons. In a further variation, scaling factors are used to correct for differences in detection fields of view between the neutron detector and the gamma-ray detector(s).

Example

As an example we consider, and have simulated, the situation for which a body is suspected of containing $^{210}Po$ or similar highly active alpha emitter. For purposes of simulation, the subject is taken to consist of an idealized structure (see FIG. 1) chemically made up of equal parts of H, N, and O with a density of 1.1. (As this approximation is only for the purpose of assessing background generation of positrons in the subject, the actual composition is not important but it will simplify the analysis by exemplifying it.) Furthermore, for purposes of the exemplary analysis, the alpha-particle emissions are taken to be confined to a 8-cm-radius sphere centered within the "body." The gamma-ray detectors are taken to be two 10-by-40 cm BGO plates 1 cm thick (for analysis, these have no skin or other shielding). A single neutron detector is taken to be 10-by-40 cm with 10% detection efficiency, a 15% geometric efficiency, and a background count rate of 0.6 counts/sec.

We address the situation in which the question is whether there are intense alpha-particle emitters present or not; that is: are detections attributable to background or to a high-rate alpha-particle emitter?

The signature of the alpha-particle emission is positron emission and neutron emission at the same rate. Positron emission, in turn, leads to positron annihilation with the emission of two, oppositely directed, 511-keV gamma rays. Our simulations show that 511 keV photons produce, in these detectors, a distinct photopeak and Compton ledge between lower cutoff and about 600 keV. We choose, for analysis, a lower cutoff of 12 keV although this is not a critical factor (see below). We take the background to be 1000 counts/sec greater than the lower cutoff of 12 keV. (We assume the background counts to be coming from a distribution that is uniform in the sense that it has equal total energy in all equal-sized energy bins, which is the most unconstrained distribution. Real situations will have background counts arising from nearby environmental sources, but this is unlikely to substantively change the analysis.)

Simulations demonstrate that slightly greater than 15% of the photons emitted pass through one of the detectors (that is, slightly more than 31% of the photons pass through one or the other of the detectors). Defining "detection" to mean production of a count in an energy bin of greater than 12 keV, the detection efficiency is found (by simulation) to be slightly greater than 80%. (If the lower cutoff is set to 30 keV, this changes only by about 1%.) This means that the joint probability for two 511 keV photons, emitted in opposite directions and passing through the detectors, is about 68% and the probability of detecting a pair of photons randomly emitted (in opposite directions) is about 21% (68% times 31%).

If we define coincidence to be two events counted (beginning) within 10 ns in different detectors in an energy bin lying between lower cutoff and 600 keV, the probability that a positron annihilation in the suspect volume will produce a coincident event is 0.2. The probability for background producing such a coincidence, directly, is $10^{-5}$.

There is, however, yet another way in which background can produce a coincidence event: background photons may produce an electron-positron pair in the body, which, in turn appears as a coincidence event. (Background gamma rays can also suffer pair-production in the detectors. However, since the simulations show this to be some 30 times less likely, it will be ignored.) The energy spectrum and flux assumed to provide the 1000 counts/sec over threshold will generate approximately 1.5 pair events per sec in the entire abdomen. If the detection efficiency is assumed to be 20% (a slight overestimate as the suspect area was a smaller volume within the abdomen), then the mean value of background-generated coincidence events is about 0.3/sec.

Suppose the (alpha, n) production rate by an intense source is 100 neutrons/sec (and 100 electron-positron pairs per sec), and assume a 10-sec count. Under these conditions, the expected counts for background only would be:
Background: neutron: 0.6·10=6;
Background gamma coincidence: 0.3·10=3;
and in the case of the source being present:
Total neutron: background+source=6+0.15·0.10·10·100=21
Total gamma coincidence: background+source=3+0.2·10·100=203

The probability that the neutron count arises from background alone would be about 1:1,000,000. The gamma-coincidence probability would be about $6·10^{-287}$ for a joint probability of less than $1:6·10^{-263}$.

From this exemplary analysis it is clear that the majority of the alpha source detection information content lies in the pair production. The reason for this is the advantage provided by the temporal coincidence of the two gamma rays and the somewhat subtle fact that, because the two gamma rays are co-emitted collinearly, the geometric efficiency of the gamma-ray detector need only be applied once.

The neutron component of the information does, however, provide the potential for distinguishing an (alpha, n) situation from a medical positron-emitter.

This example is directed at an in vivo situation. Clearly, if the intense alpha emitter is a component of a radiological dispersal device (aka "dirty bomb") wherein the quantity of radiological material would have to be many orders of magnitude greater and the alpha emitter is in intimate contact with oxygen, carbon, or some other (alpha, n) emitter, the potential for detection, via this approach is many times greater. This approach is not intended to replace existing devices such as metal detectors and x-ray machines because potentially the radiological material could be included in a metal dispersal medium that would not be an (alpha, n) emitter. A prudent design would incorporate the present invention together with conventional systems designed to for multi-purpose radiation detection. It is worthy of note that the signals from the detectors used in the present invention can simultaneously be analyzed to detect other gamma-ray or neutron-emitting sources in a multi-purpose radiation detection system. Alternatively, multi-channel signals from existing detectors may be subjected to new or additional analyses for the detection of the alpha-particle-induced emanations, provided that their geometry and electronics allow.

In summary, embodiments disclosed herein provide systems for detection of alpha particles generated by a test material in proximity to a light atomic weight element and methods for detection of alpha particles generated by a test material in proximity to a light atomic weight element, and methods for detection of alpha particles generated by a test material. The foregoing descriptions of embodiments of this invention have been presented for purposes of illustration and exposition. They are not intended to be exhaustive or to limit the invention to the precise forms disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A system for detection of alpha particles generated by a material in proximity to a light atomic weight element, the system comprising:
   a neutron detector configured to detect a rate of generation of neutrons produced by an (alpha, n) reaction between the material and the light atomic weight element;
   at least one gamma-ray detector configured to detect a rate of generation of 511 keV gamma rays produced by an annihilation reaction triggered by a positron emission from a daughter product of the light atomic weight element; and
   a computer or instrument having a comparator configured to detect a difference between the rate of generation of neutrons and rate of generation of 511 keV gamma rays, wherein a presence of an alpha particle generator is indicated if there is substantially no difference between a count rate per unit of the 511 keV gamma rays and a count rate per unit time of the neutrons.

2. The system of claim 1 wherein:
   the at least one gamma-ray detector is configured to detect a rate of generation of substantially simultaneously-emitted 511 keV gamma rays produced by an annihilation reaction triggered by a positron emission from a daughter product of the light atomic weight element; and
   the comparator is configured to compare the rate of generation of neutrons and the rate of generation of substantially simultaneously-emitted 511 keV gamma rays.

3. The system of claim 2 wherein the comparator is further configure to apply a scaling factor to at least (a) the rate of generation of neutrons or (b) the rate of generation of substantially simultaneously-emitted 511 keV gamma rays to adjust for a variation between a first field of view of the neutron detector and a second field of view of the at least one gamma-ray detector.

4. The system of claim 1 wherein:
   the at least one gamma-ray detector comprises at least two gamma-ray detectors configured to detect a rate of generation of substantially simultaneously-emitted and substantially oppositely-directed 511 keV gamma rays produced by an annihilation reaction triggered by a positron emission from a daughter product of the light atomic weight element; and
   the comparator is configured to compare the rate of generation of neutrons and the rate of generation of substantially simultaneously-emitted and substantially oppositely-directed 511 keV gamma rays.

5. The system of claim 4 wherein the comparator is further configured to apply a scaling factor to at least (a) the rate of generation of neutrons or (b) the rate of generation of substantially simultaneously-emitted and substantially oppositely-directed 511 keV gamma rays to adjust for a variation between a first field of view of the neutron detector and a second field of view of the at least one gamma-ray detector.

6. The system of claim 1 wherein the comparator is further configured to apply a scaling factor to at least (a) the rate of generation of neutrons or (b) the rate of generation of 511 keV gamma rays to adjust for a variation between a first field of view of the neutron detector and a second field of view of the at least one gamma-ray detector.

7. The system of claim 1 as part of a multi-purpose radiation detection system having a plurality of radiation detection channels, wherein:
   the neutron detector is operable to detect a first rate of generation of neutrons produced by a source other than an (alpha, n) reaction between the material and the light atomic weight element and operable to communicate the first rate through a first radiation detection channel of the multi-purpose radiation detection system; and
   the neutron detector is operable to detect a second rate of generation of neutrons produced by an (alpha, n) reaction between the material and the light atomic weight element and operable to communicate the second rate to the comparator through a second radiation detection channel of the multi-purpose radiation detection system.

8. The system of claim 1 as part of a multi-purpose radiation detection system having a plurality of radiation detection channels, wherein:
   the at least one gamma-ray detector is operable to detect a first rate of generation of gamma rays other than 511 keV gamma rays produced by an annihilation reaction triggered by a positron emission from a daughter product of the light atomic weight element and operable to communicate the first rate through a first radiation detection channel of the multi-purpose radiation detection system; and
   the at least one gamma-ray detector is operable to detect a second rate of generation of 511 keV gamma rays produced by an annihilation reaction triggered by a positron emission from a daughter product of the light atomic weight element and operable to communicate the second rate to the comparator through a second radiation detection channel of the multi-purpose radiation detection system.

9. A method for detection of alpha particles generated by a material proximate to a light atomic weight element, the method comprising:
   (a) measuring a rate of generation of neutrons produced by an (alpha, n) reaction between the material and the light atomic weight element;
   (b) measuring a rate of generation of 511 keV gamma rays produced by an annihilation reaction triggered by a positron emission from a daughter product of the light atomic weight element; and
   (c) detecting a difference between the rate of generation of neutrons with the rate of generation of 511 keV gamma rays to detect alpha particles generated by the material, wherein a presence of an alpha particle generator is indicated if there is substantially no difference between a count rate per unit time of the 511 keV gamma rays and a count rate per unit time of the neutrons.

10. The method of claim 9 wherein:
    step (b) comprises measuring a rate of generation of substantially simultaneously-emitted 511 keV gamma rays produced by an annihilation reaction triggered by a positron emission from a daughter product of the light atomic weight element; and
    step (c) comprises comparing the rate of generation of neutrons with the rate of generation of substantially simultaneously-emitted 511 keV gamma rays to detect alpha particles generated by the material.

11. The method of claim 10 further comprising a step of applying a scaling factor to at least the (a) the rate of generation of neutrons or (b) the rate of generation of substantially simultaneously-emitted 511 keV gamma rays to adjust for a variation between a first field of view used in measuring the rate of generation of neutrons and a second field of view used in measuring the rate of generation of substantially simultaneously-emitted 511 keV gamma rays.

12. The method of claim 9 wherein:
    step (b) comprises measuring a rate of generation of substantially simultaneously-emitted and substantially oppositely-directed 511 keV gamma rays produced by an annihilation reaction triggered by a positron emission from a daughter product of the light atomic weight element; and step (c) comprises comparing the rate of generation of neutrons with the rate of generation of substantially simultaneously-emitted and substantially oppositely-directed 511 keV gamma rays to detect alpha particles generated by the material.

13. The method of claim 12 further comprising a step of applying a scaling factor to at least the (a) the rate of generation of neutrons or (b) the rate of generation of substantially simultaneously-emitted and substantially oppositely-directed 511 keV gamma rays to adjust for a variation between a first field of view used in measuring the rate of generation of neutrons and a second field of view used in measuring the rate of generation of substantially simultaneously-emitted and substantially oppositely-directed 511 keV gamma rays.

14. The method of claim 9 further comprising a step of applying a scaling factor to at least (a) the rate of generation of neutrons or (b) the rate of generation of 511 keV gamma rays to adjust for a variation between a first field of view used in measuring the rate of generation of neutrons and a second field of view used in measuring the rate of generation of 511 keV gamma rays.

15. A method for detection of alpha particles generated by a material, the method comprising:
(a) disposing a light atomic weight element proximal to the material;
(b) measuring a rate of generation of neutrons produced by an (alpha, n) reaction between the material and the light atomic weight element;
(c) measuring a rate of generation of 511 keV gamma rays produced by an annihilation reaction triggered by a positron emission from a daughter product of the light atomic weight element; and
(d) detecting a difference between the rate of generation of neutrons with the rate of generation of 511 keV gamma rays to detect alpha particles generated by the material, wherein a presence of an alpha particle generator is indicated if there is substantially no difference between a count rate per unit time of the 511 keV gamma rays and a count rate per unit time of the neutrons.

16. The method of claim 15 wherein:
step (c) comprises measuring a rate of generation of substantially simultaneously-emitted 511 keV gamma rays produced by an annihilation reaction triggered by a positron emission from a daughter product of the light atomic weight element; and
step (d) comprises comparing the rate of generation of neutrons with the rate of generation of substantially simultaneously-emitted 511 keV gamma rays to detect alpha particles generated by the material.

17. The method of claim 16 further comprising a step of applying a scaling factor to at least the (a) the rate of generation of neutrons or (b) the rate of generation of substantially simultaneously-emitted 511 keV gamma rays to adjust for a variation between a first field of view used in measuring the rate of generation of neutrons and a second field of view used in measuring the rate of generation of substantially simultaneously-emitted 511 keV gamma rays.

18. The method of claim 15 wherein:
step (c) comprises measuring a rate of generation of substantially simultaneously-emitted and substantially oppositely-directed 511 keV gamma rays produced by an annihilation reaction triggered by a positron emission from a daughter product of the light atomic weight element; and
step (d) comprises comparing the rate of generation of neutrons with the rate of generation of substantially simultaneously-emitted and substantially oppositely-directed 511 keV gamma rays to detect alpha particles generated by the material.

19. The method of claim 18 further comprising a step of applying a scaling factor to at least the (a) the rate of generation of neutrons or (b) the rate of generation of substantially simultaneously-emitted and substantially oppositely-directed 511 keV gamma rays to adjust for a variation between a first field of view used in measuring the rate of generation of neutrons and a second field of view used in measuring the rate of generation of substantially simultaneously-emitted and substantially oppositely-directed 511 keV gamma rays.

20. The method of claim 15 further comprising a step of applying a scaling factor to at least the (a) the rate of generation of neutrons or (b) the rate of generation of 511 keV gamma rays to adjust for a variation between a first field of view used in measuring the rate of generation of neutrons and a second field of view used in measuring the rate of generation of 511 keV gamma rays.

\* \* \* \* \*